United States Patent
Shock

(10) Patent No.: US 11,142,449 B2
(45) Date of Patent: Oct. 12, 2021

(54) METHOD AND SYSTEM FOR DISPENSING FUEL USING SIDE-DIVERTING FUEL OUTLETS

(71) Applicant: Fuel Automation Station, LLC, Birmingham, MI (US)

(72) Inventor: Ricky Dean Shock, Victoria, TX (US)

(73) Assignee: FUEL AUTOMATION STATION, LLC, Birmingham, MI (US)

( * ) Notice: Subject to any disclaimer, the term of this patent is extended or adjusted under 35 U.S.C. 154(b) by 15 days.

(21) Appl. No.: 16/732,479

(22) Filed: Jan. 2, 2020

(65) Prior Publication Data

US 2021/0206622 A1    Jul. 8, 2021

(51) Int. Cl.
| | |
|---|---|
| *B67D 7/08* | (2010.01) |
| *B67D 7/56* | (2010.01) |
| *B67D 7/84* | (2010.01) |
| *B67D 7/36* | (2010.01) |
| *B67D 7/78* | (2010.01) |
| *B67D 7/04* | (2010.01) |

(52) U.S. Cl.
CPC ............... *B67D 7/08* (2013.01); *B67D 7/048* (2013.01); *B67D 7/36* (2013.01); *B67D 7/565* (2013.01); *B67D 7/78* (2013.01); *B67D 7/845* (2013.01)

(58) Field of Classification Search
CPC . B67D 7/08; B67D 7/78; B67D 7/048; B67D 7/36; B67D 7/565; B67D 7/845
USPC .......................................................... 141/95
See application file for complete search history.

(56) References Cited

U.S. PATENT DOCUMENTS

| | | |
|---|---|---|
| 2,340,070 A | 1/1944 | McCauley et al. |
| 2,516,150 A | 7/1950 | Samiran |
| 2,769,572 A | 11/1956 | Harman et al. |
| 2,777,461 A | 1/1957 | Wildhaber |
| 2,966,921 A | 1/1961 | Whiteman |
| 3,028,010 A | 4/1962 | Headrick |
| 3,136,295 A | 6/1964 | Gramo |
| 3,547,141 A | 12/1970 | Alexander |
| 3,605,798 A | 9/1971 | Green et al. |
| 3,618,643 A | 11/1971 | Thomson |
| 3,625,399 A | 12/1971 | Heisler |
| 3,656,134 A | 4/1972 | Brown |

(Continued)

FOREIGN PATENT DOCUMENTS

| | | |
|---|---|---|
| DE | 1147397 | 4/1963 |
| DE | 20106400 | 10/2001 |

(Continued)

OTHER PUBLICATIONS

Shimazaki, H. (1986). Development of centralized fueling and management system of kerosene heating machine. Nisseki Technical Review, vol. 28(4). Jul. 1986. pp. 184-188.

(Continued)

*Primary Examiner* — Jason K Niesz
(74) *Attorney, Agent, or Firm* — Carlson, Gaskey & Olds, P.C.

(57) ABSTRACT

An example fuel cap assembly includes a fuel cap, a sensor element extending from the fuel cap, and a fuel tube extending from the fuel cap next to the sensor element. The fuel tube includes an outlet end having at least one side-diverting fuel outlet that extends through a sidewall of the fuel tube. A fuel cap assembly kit and method of filling a fuel tank are also disclosed.

21 Claims, 4 Drawing Sheets

(56) References Cited

U.S. PATENT DOCUMENTS

| | | |
|---|---|---|
| 3,677,284 A | 7/1972 | Mendez |
| 3,881,509 A | 5/1975 | Newton |
| 4,139,019 A | 2/1979 | Bresie et al. |
| 4,284,210 A | 8/1981 | Horak |
| 4,511,311 A | 4/1985 | Olson |
| 4,591,115 A | 5/1986 | DeCarlo |
| 4,651,788 A | 3/1987 | Grosskreuz et al. |
| 4,728,005 A | 3/1988 | Jacobs et al. |
| 4,930,665 A | 6/1990 | Devine |
| 5,279,338 A * | 1/1994 | Goossens ............. B67D 7/0272 141/198 |
| 5,406,988 A | 4/1995 | Hopkins |
| 5,454,408 A | 10/1995 | DiBella et al. |
| 5,465,766 A | 11/1995 | Siegele et al. |
| 5,503,199 A | 4/1996 | Whitley, II et al. |
| 5,538,051 A | 7/1996 | Brown et al. |
| 5,551,309 A | 9/1996 | Goossens et al. |
| 5,651,400 A | 7/1997 | Corts et al. |
| 5,660,358 A | 8/1997 | Grafwallner et al. |
| 5,708,424 A | 1/1998 | Orlando et al. |
| 5,749,339 A | 5/1998 | Graham et al. |
| 5,887,567 A | 3/1999 | White et al. |
| 5,927,603 A | 7/1999 | McNabb |
| 5,884,675 A | 12/1999 | Krasnov |
| 6,098,646 A | 8/2000 | Hennemann et al. |
| 6,206,056 B1 | 3/2001 | Lagache |
| 6,564,615 B1 | 5/2003 | Carter |
| 6,601,000 B1 | 7/2003 | Barlian et al. |
| 6,651,706 B2 | 11/2003 | Litt |
| 6,697,705 B2 | 2/2004 | Johnson et al. |
| 6,745,801 B1 | 6/2004 | Cohen et al. |
| 6,755,225 B1 | 6/2004 | Niedwiecki et al. |
| 6,761,194 B1 | 7/2004 | Blong |
| 6,779,569 B1 | 8/2004 | Teer, Jr. et al. |
| 6,786,245 B1 | 9/2004 | Eichelberger et al. |
| 6,867,729 B2 | 3/2005 | Berry et al. |
| 7,063,276 B2 | 6/2006 | Newton |
| 7,106,026 B2 | 9/2006 | Moore |
| 7,353,808 B2 | 4/2008 | Kakoo |
| 7,401,511 B2 | 7/2008 | Dietmeier |
| 7,415,995 B2 | 8/2008 | Plummer et al. |
| 7,458,543 B2 | 12/2008 | Cutler et al. |
| 7,568,507 B2 | 8/2009 | Farese et al. |
| 7,610,806 B2 | 11/2009 | Skinner |
| 7,602,143 B2 | 12/2009 | Capizzo |
| 7,628,182 B2 | 12/2009 | Poulter |
| 7,937,215 B2 | 5/2011 | Humphrey |
| 7,938,151 B2 | 5/2011 | Hockner |
| 8,069,885 B2 | 12/2011 | Kederer et al. |
| 8,146,625 B2 * | 4/2012 | Xin ......................... G01F 23/74 141/95 |
| 8,448,750 B2 | 5/2013 | Gaugush et al. |
| 8,959,998 B2 | 2/2015 | Birtcher et al. |
| 9,346,662 B2 | 5/2016 | Van Vliet et al. |
| 9,371,830 B2 | 6/2016 | Moffitt, Jr. |
| 9,371,831 B2 | 6/2016 | Moffitt, Jr. |
| 9,434,598 B2 | 9/2016 | Pick et al. |
| 9,586,805 B1 | 3/2017 | Shock |
| 9,725,295 B2 | 8/2017 | McKay et al. |
| 2001/0017815 A1 | 8/2001 | Ackermann et al. |
| 2004/0163731 A1 | 8/2004 | Eichelberger et al. |
| 2004/0187950 A1 | 9/2004 | Cohen et al. |
| 2005/0109561 A1 | 5/2005 | Chopra |
| 2007/0079891 A1 | 4/2007 | Farese et al. |
| 2007/0164031 A1 | 7/2007 | Holz |
| 2007/0181212 A1 | 8/2007 | Fell |
| 2008/0078244 A1 | 4/2008 | Dietmeier |
| 2009/0314384 A1 | 12/2009 | Brakefield et al. |
| 2010/0018605 A1 | 1/2010 | Bentivoglio |
| 2011/0197988 A1 | 8/2011 | Van Vliet et al. |
| 2016/0076533 A1 | 3/2016 | Moffitt, Jr. |
| 2018/0099855 A1 * | 4/2018 | Kalala ...................... B67D 7/40 |

FOREIGN PATENT DOCUMENTS

| | | |
|---|---|---|
| DE | 10309307 | 9/2004 |
| DE | 102006025025 | 12/2006 |
| DE | 102006038652 | 2/2008 |
| EP | 0161042 | 11/1985 |
| EP | 0433041 | 6/2001 |
| GB | 2485832 | 5/2012 |
| RU | 28347 | 3/2003 |
| RU | 91135 | 1/2010 |
| RU | 2452668 | 1/2012 |
| SU | 949644 | 8/1982 |
| WO | 0177006 | 10/2001 |
| WO | 03029721 | 4/2003 |
| WO | 03093118 | 11/2003 |
| WO | 2006005686 | 1/2006 |
| WO | 2006116572 | 11/2006 |
| WO | 2007087849 | 8/2007 |
| WO | 2008083830 | 7/2008 |
| WO | 2009026607 | 3/2009 |
| WO | 20090608065 | 6/2009 |

OTHER PUBLICATIONS

Technical Document. Surface vehicle standard. SAE International. Sep. 2014. pp. 1-5.

Oilfield Business: Technologies. Frac Shack Inc. introduces world's first Bi-Fuel Distribution Unit for hydraulic fracturing industry. Texas Oil & Gas: The National Magazine for Oil & Gas in Texas. vol. 4, Issue 2. 2015. p. 27.

Frac Shack International. Publications & Endorsements. Retrieved Aug. 23, 2016 from: http://www.fracshack.com.

Frac Shack International. Technology. Retrieved Aug. 23, 2016 from: http://www.fracshack.com.

Frac Shack International. Design Benefits. Retrieved Aug. 23, 2016 from: http://www.fracshack.com.

Frac Shack International. Service. Retrieved Aug. 23, 2016 from: http://www.fracshack.com.

Frac Shack International. Frac Shack Series—Series A. Retrieved Aug. 23, 2016 from: http://www.fracshack.com.

Frac Shack International. Frac Shack Series—Series B. Retrieved Aug. 23, 2016 from: http://www.fracshack.com.

Frac Shack International. Frac Shack Series—Series C. Retrieved Aug. 23, 2016 from: http://www.fracshack.com.

Frac Shack International. Frac Shack Series—Series D. Retrieved Aug. 23, 2016 from: http://www.fracshack.com.

Frac Shack International. Frac Shack Series—Series E. Retrieved Aug. 23, 2016 from: http://www.fracshack.com.

Frac Shack International. Frac Shack Series—Series EG. Retrieved Aug. 23, 2016 from: http://www.fracshack.com.

Mann Tek. Dry Disconnect Couplings. Retrieved Jul. 22, 2016 from: http://www.manntek.com/products/drydisconnectcouplings p. 1-4.

Mann Tek. Dry Aviation Couplings. Retrieved Jul. 22, 2016 from: http://www.manntek.com/products/dryaviationcouplings p. 1-4.

Waterman, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1.1123066.

U.S. Appl. No. 15/655,115, filed Jul. 20, 2017.
U.S. Appl. No. 15/782,335, filed Oct. 12, 2017.
U.S. Appl. No. 15/673,730, filed Aug. 10, 2017.
U.S. Appl. No. 15/673,796, filed Aug. 10, 2017.
U.S. Appl. No. 15/416,198, filed Jan. 26, 2017.
U.S. Appl. No. 15/703,285, filed Sep. 13, 2017.

* cited by examiner

METHOD AND SYSTEM FOR DISPENSING FUEL USING SIDE-DIVERTING FUEL OUTLETS

BACKGROUND

This application relates to delivering fluid, such as fuel, into a tank.

Automated fuel delivery systems are known that automatically dispense fuel into a tank based on fuel tank level readings from a fluid level sensor. However, if the fluid level sensor does not return accurate readings, a refueling operation may be initiated or terminated at an inappropriate time.

SUMMARY

A fuel cap assembly according to an example of the present disclosure includes a fuel cap, a sensor element extending from the fuel cap, and a fuel tube extending from the fuel cap next to the sensor element. The fuel tube includes an outlet end having at least one side-diverting fuel outlet that extends through a sidewall of the fuel tube.

In a further embodiment of any of the foregoing embodiments, the at least one side-diverting fuel outlet includes a first side-diverting fuel outlet and a second side-diverting fuel outlet that is separate from the first side-diverting fuel outlet.

In a further embodiment of any of the foregoing embodiments, the first and second side-diverting fuel outlets are disposed at a same axial position with respect to a central longitudinal axis of the fuel tube.

In a further embodiment of any of the foregoing embodiments, the first and second side-diverting fuel outlets are coaxial about an axis that is substantially perpendicular to the central longitudinal axis.

In a further embodiment of any of the foregoing embodiments, the sensor element is longer than the fuel tube.

In a further embodiment of any of the foregoing embodiments, the at least one side-diverting fuel outlet terminates prior to an axial end wall of the outlet end of the fuel tube.

In a further embodiment of any of the foregoing embodiments, the at least one side-diverting fuel outlet has a length measured along a central longitudinal axis of the fuel tube and also has a width where the length is greater than the width, and the length is less than three times the width.

In a further embodiment of any of the foregoing embodiments, the fuel cap has a hose port fluidly connected to an inlet end of the fuel tube.

In a further embodiment of any of the foregoing embodiments, the sensor element includes a sensor probe disposed within a protective sheath.

A fuel dispensing system according to an example of the present disclosure includes a mobile fuel distribution station, a plurality of hoses, and a plurality of fuel cap assemblies. The mobile fuel distribution station includes a manifold having a plurality of outlets. Each of the hoses has a first end configured to receive fuel from a respective one of the outlets, and an opposing second end. Each fuel cap assembly includes a fuel cap, a sensor element extending from the fuel cap, and a fuel tube extending from the fuel cap next to the sensor element. The fuel tube is configured to receive fuel from the second end of a respective one of the hoses, and has an outlet end having at least one side-diverting fuel outlet that extends through a sidewall of the fuel tube.

In a further embodiment of any of the foregoing embodiments, for each fuel tube, the at least one side-diverting fuel outlet includes a first side-diverting outlet and a second side-diverting fuel outlet that is separate from the first side-diverting fuel outlet.

In a further embodiment of any of the foregoing embodiments, for each fuel tube, the first and second side-diverting fuel outlets are disposed at a same axial position with respect to a central longitudinal axis of the fuel tube.

In a further embodiment of any of the foregoing embodiments, the sensor element is longer than the fuel tube.

A method of filling a fuel tank according to an example of the present disclosure includes providing a fuel cap assembly that has a fuel cap, a sensor element extending from the fuel cap, and a fuel tube extending from the fuel cap next to the sensor element. The fuel tube has an outlet end having at least one side-diverting fuel outlet that extends through a sidewall of the fuel tube. The method includes securing the fuel cap assembly to an inlet of a fuel tank, such that the outlet end of the fuel tube and a distal end of the sensor element are disposed within the fuel tank. The method also includes providing fuel into the fuel tube and dispensing fuel from the fuel tube into the fuel tank through the at least one side-diverting fuel outlet.

In a further embodiment of any of the foregoing embodiments, the method includes utilizing the sensor element during the dispensing to transmit radar waves into the fuel tank, measure reflected radar waves, and determine a fuel level in the fuel tank based on the reflected radar waves.

In a further embodiment of any of the foregoing embodiments, the at least one side-diverting fuel outlet includes a first side-diverting fuel outlet and a second side-diverting fuel outlet that is separate from the first side-diverting fuel outlet, and the dispensing includes dispensing fuel through the first and second side-diverting fuel outlets.

In a further embodiment of any of the foregoing embodiments, the securing is performed such that a respective central longitudinal axis of each of the fuel tube and sensor are substantially perpendicular to a bottom of the fuel tank.

In a further embodiment of any of the foregoing embodiments, the securing is performed to attach a plurality of the fuel cap assemblies to a plurality of different fuel tanks, and the providing fuel includes delivering fuel from a fuel manifold of a mobile fuel distribution station to the plurality of different fuel tanks using a plurality of hoses, each hose fluidly connecting a respective outlet of the fuel manifold to an inlet end of a respective one of the fuel tubes.

In a further embodiment of any of the foregoing embodiments, the providing fuel includes pumping fuel from a fuel source into the manifold.

In a further embodiment of any of the foregoing embodiments, the method includes transporting a mobile fuel distribution system that includes the fuel cap assemblies, hoses, and manifold to a well site, and performing the securing, providing fuel, and dispensing fuel at the well site.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Examples in the present disclosure describe fuel cap assemblies that include a fuel cap, a sensor element, and a fuel tube. When the fuel cap is secured to a fuel tank, the fuel tube extends into the fuel tank for dispensing fuel into the tank, and the sensor element can perform measurements to determine a level of fuel in the tank. Fuel dispensing into the tank can be started and stopped based on those measurements. As will be described below in greater detail, the fuel tube includes one or more side-diverting fuel outlets which facilitate accurate fuel level measurements by the sensor element.

Figure 1:
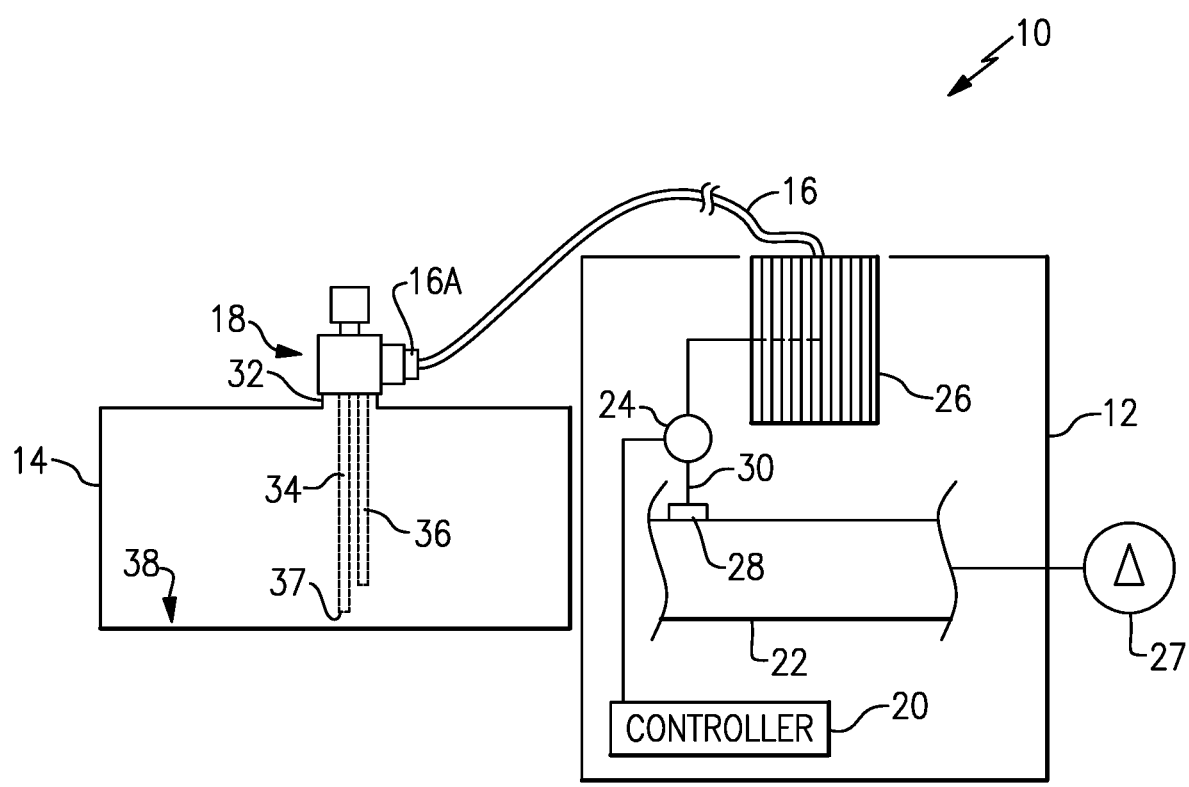
FIG. 1 schematically illustrates an example fuel dispensing system that includes a mobile fuel distribution station and a fuel cap assembly.

FIG. 1 schematically illustrates an example fuel dispensing system 10 that includes a mobile fuel distribution station 12 operable to refuel a fuel tank 14 through a hose 16 and a fuel cap assembly 18. For example, station 12 includes a trailer, container, pallet, or the like. The mobile fuel distribution station 12 includes a controller 20, a manifold 22, a control valve 24, a hose reel 26, and one or more pump 27. The manifold 22 includes a plurality of outlets 28, one of which is shown in FIG. 1. Fuel line 30 connects the outlet 28 to the hose reel 26. The control valve 24 is in the fuel line 30. The controller 20 is operable to adjust the control valve 24 between open and closed positions to selectively permit fuel flow from the manifold 22 to the hose reel 26 and the hose 16. For example, the control valve 24 is a powered valve, such as a solenoid or pneumatic valve.

The hose 16 in FIG. 1 includes a connector end 16A that connects to the fuel cap assembly 18. The fuel cap assembly 18 is mounted to an inlet 32 of the fuel tank 14, e.g., through a threaded or other connection that locks the fuel cap assembly 18 onto the inlet 32. The mounting causes the fuel cap assembly 18 to be fixed relative to the fuel tank 14 during refueling. The fuel cap assembly 18 includes a sensor element 34 and a fuel tube 36 that are adjacent to each other and are inserted into the fuel tank 14, which may correspond to a piece of equipment that is or will be in need of refueling (e.g., a generator, pumper or blender at a hydraulic fracturing site, etc.). The sensor element 34 is configured to generate signals indicative of the fuel level in the fuel tank 14. The signals are communicated to the controller 20 which uses the signals to determine whether the control valve 24 should be adjusted (e.g., opened or closed).

Fuel is provided through the fuel tube 36 into the fuel tank 14. The fuel cap assembly 18 provides a fluid connection between the hose 16 and an inlet end (not shown) of the fuel tube 36. In the example of FIG. 1, the sensor element 34 and fuel tube 36 are both substantially perpendicular to the bottom 38 of the fuel tank 14. However, it is understood that other arrangements could be used where the sensor element 34 and fuel tube 36 are inserted into the fuel tank 14 to point downwards, but are not perpendicular to the bottom 38. In one example, when the fuel cap assembly 18 is mounted to the fuel tank 14, a distal end 37 of the sensor element 34 is less than six inches away from the bottom 38 of the fuel tank 14.

At least the control valve 24 and sensor element 34 are in communication with the controller 20. As an example, the controller 20 includes processing circuitry configured to carry out any of the functions described herein. In one further example, the controller 20 includes a programmable logic controller (PLC) with a touch-screen for user input and display of status data. For example, the screen may simultaneously show multiple fluid levels of the equipment that is being serviced.

The sensor element 34 transmits signals to the controller 20 that are indicative of a fuel level in the fuel tank 14. The controller 20 interprets the signals and determines the fuel level for the fuel tank 14. In response to a fuel level that falls below a lower threshold, the controller 20 opens the control valve 24 associated with the hose 16 and activates the one or more pumps 37 to provide fuel flow into the manifold 22 and through the open control valve 24 and reel 26 such that fuel is provided through the hose 16 and fuel cap assembly 18 into the fuel tank 14. The lower threshold may correspond to an empty fuel level of the fuel tank 14, but more typically the lower threshold will be a level above the empty level to reduce the potential that the equipment completely runs out of fuel and shuts down.

The controller 20 also determines when the fuel level in the fuel tank 14 reaches an upper threshold. The upper threshold may correspond to a full fuel level of the fuel tank 14, but more typically the upper threshold will be a level below the full level to reduce the potential for overflow. In response to reaching the upper threshold, the controller 20 closes the respective control valve 24 and ceases the one or more pumps.

Although only a single hose 16, reel 26, control valve 24, outlet 28, and fuel cap assembly 18 are shown in FIG. 1, it is understood that there could be a plurality of these, such that the manifold 22 has a plurality of outlets 28, each connected to a respective hose 16 on a respective hose reel 26, with each hose 16 being connected to a respective fuel cap assembly 18 of a respective fuel tank 14, and each hose 16 having a respective associated control valve 24. In such an example, even if a particular one of the control valves 24 is being shut down, the pumps may remain on to fuel others of the fuel tanks 14 if others of the control valves 24 are open or are to be opened. Multiple control valves 24 may be open at one time, to provide fuel to multiple fuel tanks at one time.

Additionally, the controller 20 may have a manual mode in which a user can control at least some functions through the PLC, such as starting and stopping the pump and opening and closing control valves 24. For example, manual mode may be used at the beginning of a job when initially filling fuel tanks 14 to levels at which the sensor elements 34 can detect fuel and/or during a job if a sensor element 34 becomes inoperable. Of course, operating in manual mode may deactivate some automated functions, such as filling at the low threshold or stopping at the high threshold.

Figure 2:
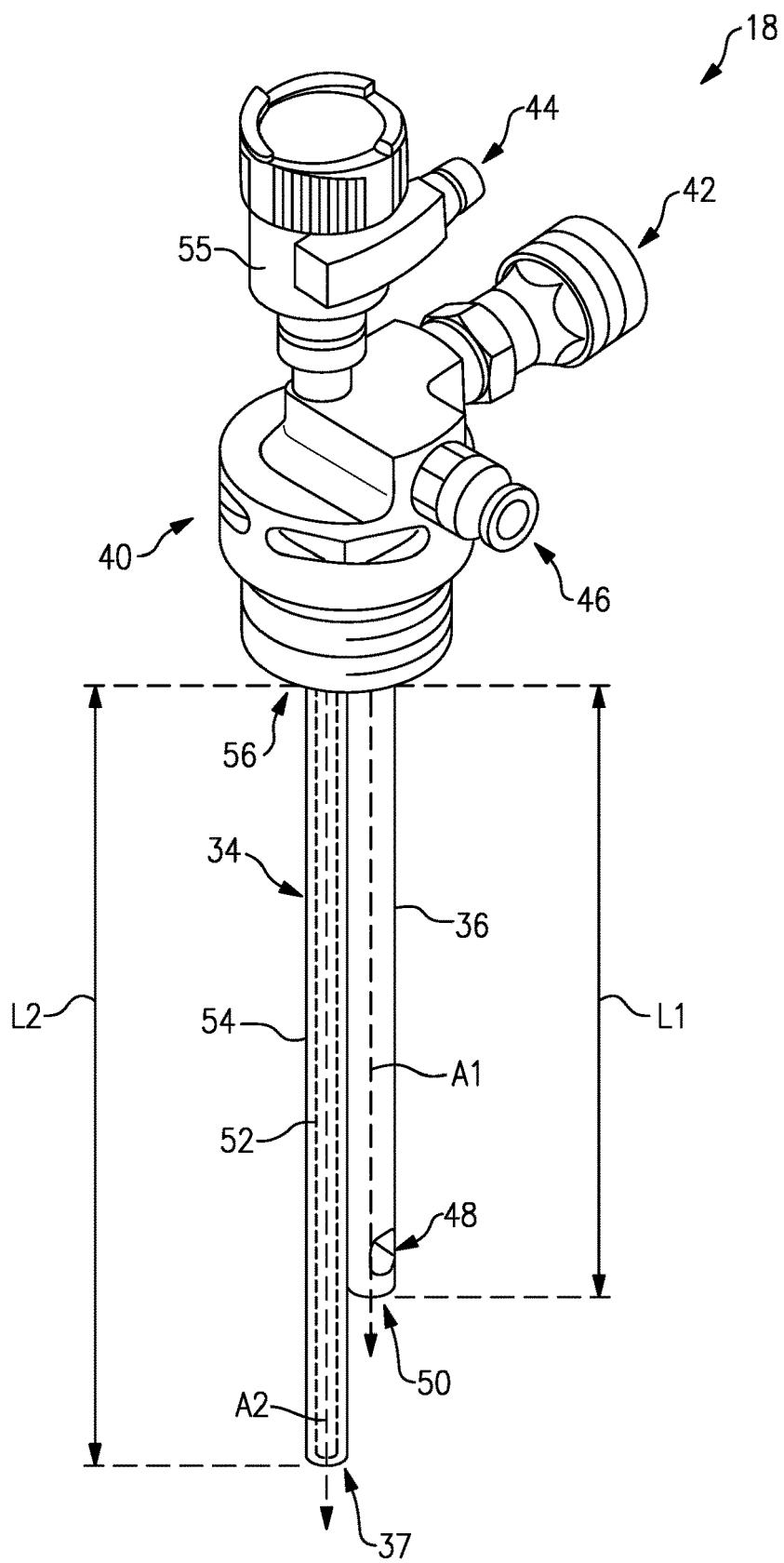
FIG. 2 illustrates an isolated view of the fuel cap assembly of FIG. 1.

FIG. 2 illustrates an isolated view of the fuel cap assembly 18 of FIG. 1. The fuel cap assembly 18 includes a fuel cap 40 that includes a hose port 42, a sensor wire port 44, and a vent port 46. The hose port 42 is detachably connectable to the connector end 16A of hose 16 (e.g., using a dry disconnect fitting). The sensor wire port 44 is detachably connectable to a sensor wire that provides for communication between the sensor element 34 and the controller 20. Alternatively, wireless communication could be used for the sensor element 34 to communicate with the controller 20. The vent port 46 may be provided for attaching to a drain hose to drain any overflow into a containment bucket and/or reduce air pressure build-up in the fuel tank 14. Thus, a user may first mount the fuel cap 40 to the inlet 32 of the fuel tank 14 of the equipment, followed by connecting the hose 16 to the port 42, connecting a sensor wire (not shown) to the port 44, and optionally connecting a drain hose to vent port 46.

The fuel tube 36 that delivers fuel into the fuel tank 14 includes an outlet end 50 having at least one side-diverting fuel outlet 48 in its sidewall for dispensing fuel received through the hose port 42. The fuel tube 36 also has an inlet end (see item 60 in FIG. 3) that is opposite the outlet end 50 and is disposed within the fuel cap 40.

The sensor element 34 includes a sensor probe 52 disposed within a protective sheath 54. In the non-limiting example of FIG. 2, the protective sheath 54 is a tube. However, other protective sheath geometries could be used. The protective sheath 54 may be a metal alloy (e.g., stainless steel or aluminum) or polymer tube that surrounds the sensor probe. One or more bushings may be provided between the sensor probe 52 and the protective sheath 54, to separate the sensor probe 52 from the sheath 54. The sheath 54 shields the sensor probe 52 from contact by external objects, the walls of a fuel tank 14, and other components in the fuel tank 14, which might otherwise increase the potential for faulty sensor readings.

The sensor element 34 is operatively connected to a sensor device 55 that utilizes the sensor probe 52 to measure a fuel level in the fuel tank 14. The sensor device 55 may be any type of sensor that is capable of detecting fluid or fuel level in a tank. In one example, the sensor device 55 is a guided wave radar sensor that operates as a transmitter/sensor that emits radar waves, most typically radio frequency waves, down the sensor probe 52, and measures reflected radar waves to determine a fluid level in the fuel tank 14. The sensor probe 52 serves as a guide for the radar waves. The radar waves reflect off a surface of the fuel and the reflected radar waves are received into the transmitter/sensor. The sensor device 55 provides a measurement that is indicative of the "time of flight" of the radar waves, i.e., how long it takes from emission of the radar waves for the radar waves to reflect back to the transmitter/sensor. Based on the measurement, sensor device 55 or the controller 20 can determine the distance that the radar waves travel. A longer distance thus indicates a lower fuel level (farther away) and a shorter distance indicates a higher fuel level (closer).

The fuel tube 36 extends along a central longitudinal axis A1, and the sensor element 34 extends along a central longitudinal axis A2 that is substantially parallel to the axis A1.

Figure 3:
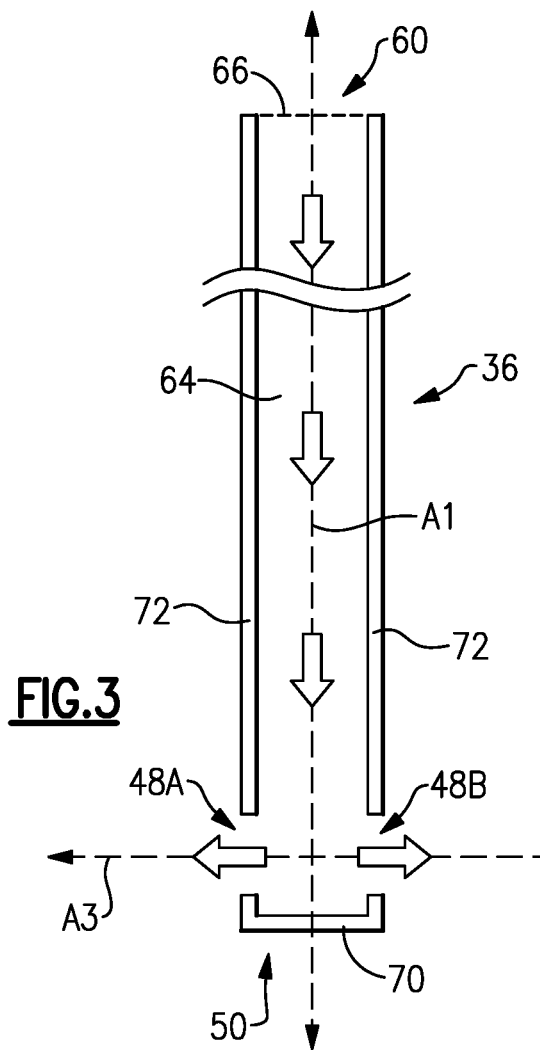
FIG. 3 schematically illustrates a cross-sectional view of a fuel tube of the assembly of FIG. 2.

FIG. 3 schematically illustrates a cross-sectional view of the fuel tube 36. As shown in FIG. 3, the fuel tube 36 includes an internal fuel passage 64 that extends between the inlet end 60 and the opposing outlet end 50 of the fuel tube 36. The fuel passage 64 includes an inlet 66 at the inlet end 60, and the outlet end 50 includes the side-diverting fuel outlets 48A-B that deliver fuel from the fuel passage 64. The inlet 66 is centered about the central longitudinal axis A1.

The fuel outlets 48A-B are separate from each other and are disposed at opposing positions about the central longitudinal axis A1 of the fuel tube 36. The fuel outlets 48A-B terminate prior to an axial end wall 70 at the outlet end 50 of the fuel tube 36. The fuel outlets 48A-B are coaxial about a common central longitudinal axis A3 that is substantially perpendicular to the central longitudinal axis A1 of the fuel tube 36. The fuel outlets 48A-B are also disposed at a same axial position with respect to the axis A1.

Instead of being disposed in the axial end wall 70 at the outlet end 50 of the fuel tube 36, the plurality of outlets 48A-B extend through a cylindrical sidewall 72 of the fuel tube 36. This diverts a flow of fuel (shown schematically with block arrows in FIG. 6) sideways through the sidewall 72.

A comparative fuel tube that has an opening in an axial end wall (e.g., axial end wall 70) discharges a fuel stream axially toward a bottom of a fuel tank. The fuel stream causes existing fuel in the vicinity of the end of the fuel tube to be displaced at a turbulent area where incoming fuel contacts existing fuel in the tank, potentially causing artificially high or low sensor readings. Such erroneous measurements could cause refueling to either terminate prematurely or terminate later than intended. In comparison to such fuel tubes, the side-diverting fuel outlets 48 of the present disclosure direct the fuel away from the distal end 37 of the sensor element 34, thereby facilitating a reduction in turbulence at the distal end 37 of the sensor element 34 and more accurate measurements from the sensor probe 52.

Referring again to FIG. 2, the fuel tube 36 and sensor element 34 each extend longitudinally outward from an end 56 of the fuel cap 40. The fuel tube 36 has a length L1 measured along vertical axis A1 from the end 56 of the fuel cap 40 to the outlet end 50. The sensor probe 52 and its sheath 54 are shown as having a same length L2 as measured along vertical axis A2 from the end 56 of the fuel cap 40 to the distal end 37 of the sensor element 34. The length L1 is less than the length L2. Thus, the sensor element 34 is longer than the fuel tube 36, and when the example fuel cap assembly 18 of FIG. 2 is mounted to a fuel tank 14, the sensor element 34 extends extend further into the fuel tank 14 than the fuel tube 36. This shorter length of the fuel tube 36 can further improve the accuracy of the sensor probe 52 by facilitating a further reduction in turbulence at the distal end 37 of the sensor probe 52.

Figure 4:
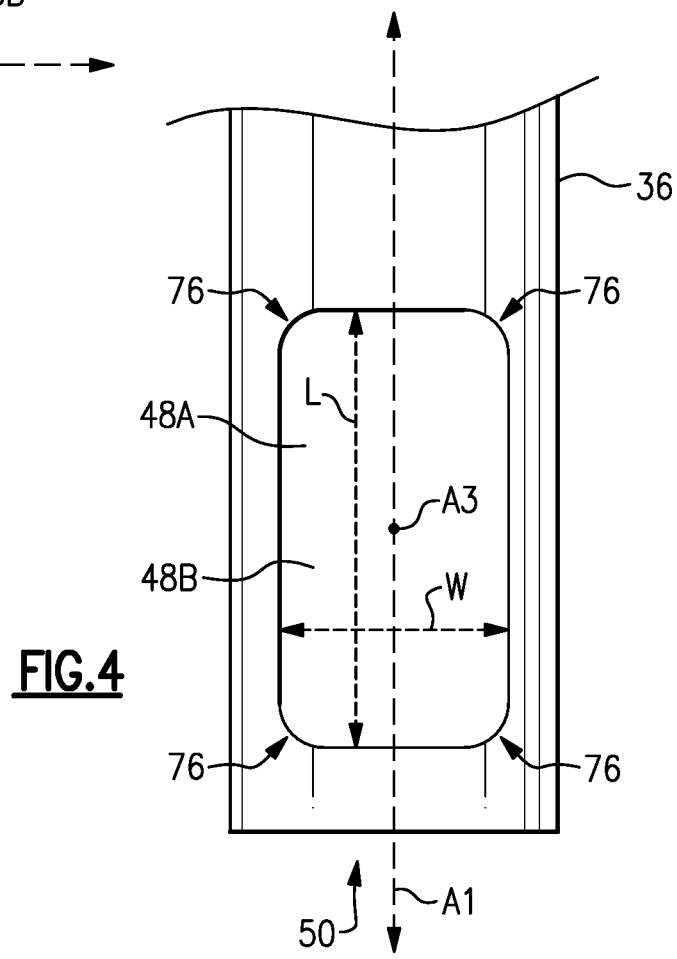
FIG. 4 schematically illustrates another view of the fuel tube of FIG. 4.

FIG. 4 displays an example implementation of the fuel tube 36. As shown in FIG. 4, each side-diverting fuel outlet 48A-B has a length L along the central longitudinal axis A1 and a width W perpendicular to that length, such that the length L is longer than the width W. In one example, the length L is greater than the width W but is less than three times the width W, and the fuel outlets 48A-B therefore correspond to low aspect ratio openings. Also, as shown in FIG. 4, the side-diverting fuel outlets 48A-B can have substantially the same size and shape, which in the depicted example is substantially rectangular with rounded corners 76. Although two side-diverting fuel outlets 48A-B are shown in FIGS. 3-4, it is understood that a single fuel side-diverting outlet could be used, or that more than two fuel side-diverting outlets could be used. Also, it is understood that in other embodiments the side-diverting fuel outlets 48 could have different sizes.

Figure 5:
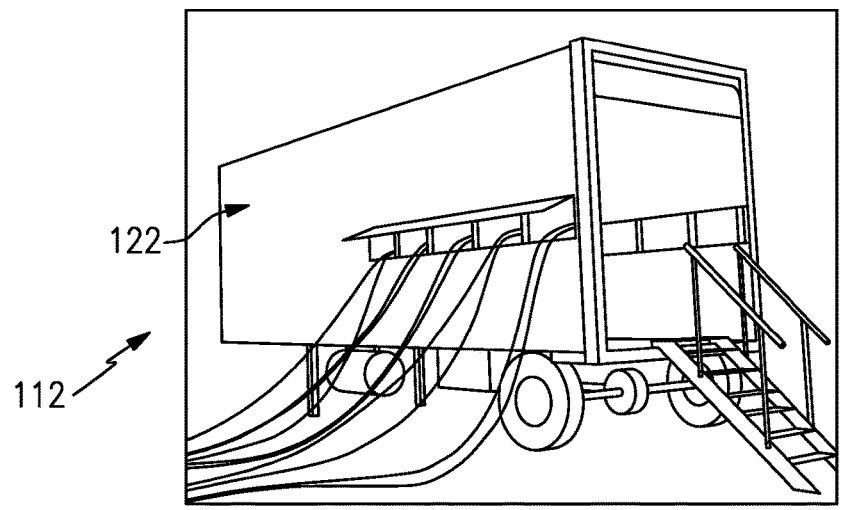
FIG. 5 schematically illustrates an example implementation of the mobile fuel distribution station of FIG. 1.
Figure 6:
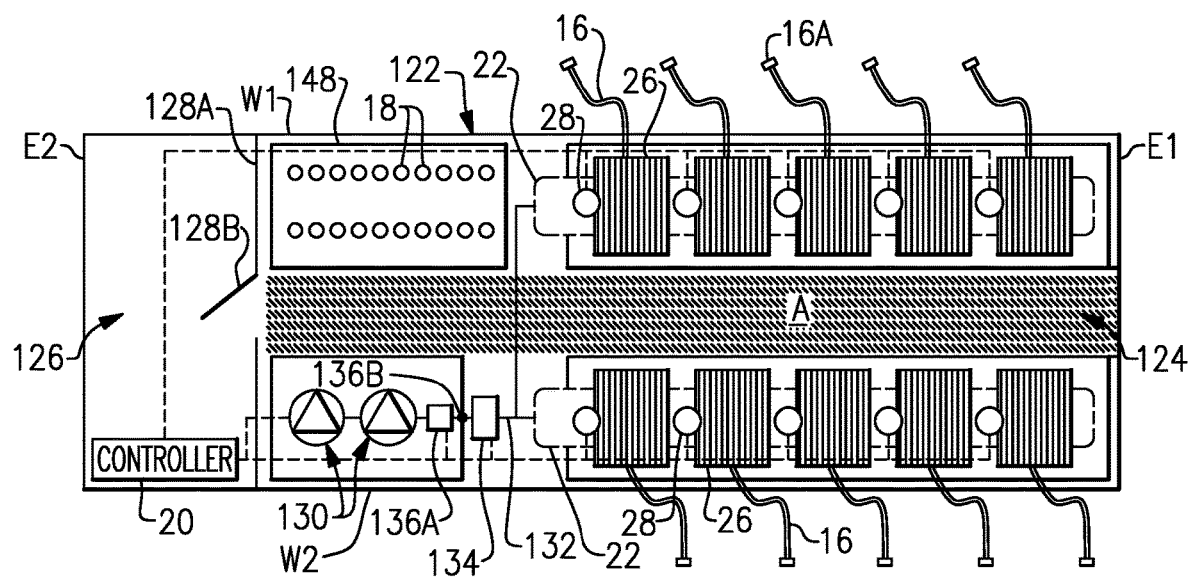
FIG. 6 illustrates an example internal layout of the mobile fuel distribution station of FIG. 5.

FIG. 5 schematically illustrates a mobile fuel distribution station 112 that is an example implementation of the mobile fuel distribution station 12 of FIG. 1, and FIG. 6 illustrates an example internal layout of the example station 12 of FIG. 5. As will be described, the station 12/112 may be utilized to distribute fuel in a "hot-refueling" capacity to multiple pieces of equipment while the equipment is running at a work site, such as hydraulic fracturing equipment (e.g., pumpers and blenders) at a well site, or electrical generators. Of course, these are non-limiting examples, and it is understood that the station 12/112 may be used in mobile delivery of fuel to the same or items in other environments as well. Also, it is understood that the fuel cap assemblies 18 can be used with mobile fuel distribution stations other than those depicted in FIGS. 5-6.

In the depicted example, the station 112 includes a mobile trailer 122. Generally, the mobile trailer 122 is elongated and has first and second opposed trailer sidewalls W1 and W2 that join first and second opposed trailer end walls E1 and E2. Most typically, the trailer 122 will also have a closed top (not shown). The mobile trailer 122 may have wheels that permit the mobile trailer 122 to be moved by a vehicle from site to site to service different hot-refueling operations. In the depicted example, the mobile trailer 122 has two compartments. A first compartment 124 includes the physical components for distributing fuel and a second compartment 126 serves as an isolated control room for managing and monitoring fuel distribution. The compartments 124/126 are separated by an inside wall 128A that has an inside door 128B.

The first compartment 124 includes one or more pumps 130. Fuel may be provided to the one or more pumps 130 from an external fuel source, such as a tanker truck on the site. On the trailer 122, the one or more pumps 130 are fluidly connected to one or more manifolds 22 via a fluid line 132. The fluid line 132 may include, but is not limited to, hard piping. The fluid line 132 may include a filtration and air eliminator system 136A, one or more sensors 136B, and/or a register 134 for metering the fluid. Although optional, the system 136A is beneficial in many implementations to remove foreign particles and air from the fuel prior to delivery to the equipment. The one or more sensors 136B may include a temperature sensor, a pressure sensor, or a combination thereof, which assist in fuel distribution management.

In one example, the controller 20 also tracks the amount of fuel provided to the respective fuel tanks 14. For instance, the register 134 precisely measures the amount of fuel provided from the pump or pumps 130. As an example, the register 134 is an electronic register and has a resolution of about 0.1 gallons. The register 134 communicates measurement data to the controller 20. The controller 20 can thus determine the total amount of fuel used to very precise levels. The controller 20 may also be configured to provide outputs of the total amount of fuel consumed. For instance, a user may program the controller 20 to provide outputs at desired intervals, such as by worker shifts or daily, weekly, or monthly periods. The outputs may also be used to generate invoices for the amount of fuel used. As an example, the controller 20 may provide a daily output of fuel use and trigger the generation of an invoice that corresponds to the daily fuel use, thereby enabling almost instantaneous invoicing.

In the illustrated example, the station 112 includes two manifolds 22 that are arranged on opposed sides of the compartment 124. As an example, the manifolds 22 are elongated tubes that are generally larger in diameter than the fuel line 132 and that have at least one inlet and multiple outlets. A plurality of hoses 16 are provided. In the depicted example, each hose 16 is wound, at least initially, on a reel 26 that is rotatable to extend or retract the hose 16 externally through one or more windows of the trailer 122. Each reel 26 may have an associated motor to mechanically extend and retract the hose 16. As will be appreciated, fewer or additional reels and hoses may be used in alternative examples.

In the illustrated example, the first compartment 124 also includes a sensor support rack 148 that can be used for storing the fuel cap assemblies 18 when not in use. Each hose 16 may include a connector end 16A and each fuel cap assembly 18 may have a corresponding mating connector (e.g., the port 42) to facilitate rapid connection and disconnection of the hose 16. For example, the connector end 16A and a mating connector on the fuel cap assembly 18 may form a hydraulic quick-connect.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A fuel cap assembly, comprising:
   a fuel cap;
   a sensor element extending away from an end of the fuel cap and terminating at a sensor element distal end; and
   a fuel tube extending away from the end of the fuel cap and terminating at a fuel tube distal end, and extending next to the sensor element, the fuel tube including an outlet end having at least one side-diverting fuel outlet that extends through a sidewall of the fuel tube, wherein a length of the fuel tube between the end of fuel cap and the fuel tube distal end is less than a length of the sensor element between the end of the fuel cap and the sensor element distal end.

2. The fuel cap assembly of claim 1, wherein the at least one side-diverting fuel outlet terminates prior to an axial end wall of the outlet end of the fuel tube, and the axial end wall is closed and free of openings.

3. The fuel cap assembly of claim 1, wherein;
   the at least one side-diverting fuel outlet has a length measured along a central longitudinal axis of the fuel tube and also has a width;
   the length is greater than the width; and
   the length is less than three times the width.

4. The fuel cap assembly of claim 1, wherein the at least one side-diverting fuel outlet includes a single pair of outlets that are coaxial about an axis that is substantially perpendicular to a central longitudinal axis of the fuel tube, and the sensor element is evenly spaced between the pair of outlets.

5. The fuel cap assembly of claim 1, wherein the fuel cap includes a hose port fluidly connected to an inlet end of the fuel tube.

6. The fuel cap assembly of claim 5, wherein the sensor element comprises a sensor probe disposed within a protective sheath.

7. The fuel cap assembly of claim 1, wherein the at least one side-diverting fuel outlet includes a first side-diverting fuel outlet and a second side-diverting fuel outlet that is separate from the first side-diverting fuel outlet.

8. The fuel cap assembly of claim 7, wherein the first and second side-diverting fuel outlets are disposed at a same axial position with respect to a central longitudinal axis of the fuel tube.

9. The fuel cap assembly of claim 8, wherein the first and second side-diverting fuel outlets are coaxial about an axis that is substantially perpendicular to the central longitudinal axis.

10. A fuel dispensing system comprising:
    a mobile fuel distribution station including a manifold having a plurality of outlets;
    a plurality of hoses, each hose having a first end configured to receive fuel from a respective one of the outlets, and an opposing second end; and a plurality of fuel cap assemblies, each including:
  a fuel cap;
  a sensor element extending from the fuel cap; and
  a fuel tube extending from the fuel cap next to the sensor element, the fuel tube configured to receive fuel from the second end of a respective one of the hoses, and including an outlet end having at least one side-diverting fuel outlet that extends through a sidewall of the fuel tube;
  wherein the at least one side-diverting fuel outlet has a length measured along a central longitudinal axis of the fuel tube and also has a width, the length is greater than the width, and the length is less than three times the width.

11. The fuel dispensing system of claim 10, wherein:
the sensor element extends away from an end of the fuel cap towards a sensor element distal end;
the fuel tube extends away from the end of the fuel cap towards a fuel tube distal end; and
a length of the fuel tube between the end of fuel cap and the fuel tube distal end is less than a length of the sensor element between the end of the fuel cap and the sensor element distal end.

12. The fuel dispensing system of claim 10, wherein an axial end wall of the outlet end of the fuel tube is closed and free of openings.

13. The fuel dispensing system of claim 10, wherein for each fuel tube, the at least one side-diverting fuel outlet includes a first side-diverting outlet and a second side-diverting fuel outlet that is separate from the first side-diverting fuel outlet.

14. The fuel dispensing system of claim 13, wherein for each fuel tube, the first and second side-diverting fuel outlets are disposed at a same axial position with respect to a central longitudinal axis of the fuel tube.

15. A method of filling a fuel tank, comprising:
providing a fuel cap assembly that includes a fuel cap, a sensor element extending away from an end of the fuel cap towards a sensor element distal end, and a fuel tube extending away from the end of the fuel cap towards a fuel tube distal end and extending next to the sensor element, the fuel tube including an outlet end having at least one side-diverting fuel outlet that extends through a sidewall of the fuel tube, wherein a length of the fuel tube between the end of fuel cap and the fuel tube distal end is less than a length of the sensor element between the end of the fuel cap and the sensor element distal end;
securing the fuel cap assembly to an inlet of a fuel tank, such that the outlet end of the fuel tube and the sensor element distal end are disposed within the fuel tank; and
providing fuel into the fuel tube and dispensing fuel from the fuel tube into the fuel tank through the at least one side-diverting fuel outlet.

16. The method of claim 15, comprising:
utilizing the sensor element during said dispensing to transmit radar waves into the fuel tank, measure reflected radar waves, and determine a fuel level in the fuel tank based on the reflected radar waves.

17. The method of claim 15, wherein:
the at least one side-diverting fuel outlet includes a first side-diverting fuel outlet and a second side-diverting fuel outlet that is separate from the first side-diverting fuel outlet; and
said dispensing fuel includes dispensing fuel through the first and second side-diverting fuel outlets.

18. The method of claim 15, wherein said securing is performed such that a respective central longitudinal axis of each of the fuel tube and sensor are substantially perpendicular to a bottom of the fuel tank.

19. The method of claim 15, wherein:
said securing is performed to attach a plurality of the fuel cap assemblies to a plurality of different fuel tanks; and
said providing fuel comprises delivering fuel from a fuel manifold of a mobile fuel distribution station to the plurality of different fuel tanks using a plurality of hoses, each hose fluidly connecting a respective outlet of the fuel manifold to an inlet end of a respective one of the fuel tubes.

20. The method of claim 19, comprising:
transporting a mobile fuel distribution system that includes the fuel cap assemblies, hoses, and manifold to a well site, and performing said securing, providing fuel, and dispensing fuel at the well site.

21. The method of claim 15, wherein the at least one side-diverting fuel outlet includes a single pair of outlets that are coaxial about an axis that is substantially perpendicular to a central longitudinal axis of the fuel tube, and the sensor element is evenly spaced between the pair of outlets.

* * * * *